US012109576B2

(12) United States Patent
Cowan

(10) Patent No.: US 12,109,576 B2
(45) Date of Patent: Oct. 8, 2024

(54) DUAL-HEADED PAINT SPRAY WAND

(71) Applicant: Mark A. Cowan, Huntington Beach, CA (US)

(72) Inventor: Mark A. Cowan, Huntington Beach, CA (US)

( * ) Notice: Subject to any disclaimer, the term of this patent is extended or adjusted under 35 U.S.C. 154(b) by 0 days.

(21) Appl. No.: 16/264,008

(22) Filed: Jan. 31, 2019

(65) Prior Publication Data

US 2019/0299222 A1 Oct. 3, 2019

Related U.S. Application Data

(63) Continuation of application No. PCT/US2017/044593, filed on Jul. 31, 2017, which is a continuation of application No. 15/225,172, filed on Aug. 1, 2016, now Pat. No. 10,124,348.

(60) Provisional application No. 62/199,174, filed on Jul. 30, 2015.

(51) Int. Cl.
*B05B 1/04* (2006.01)
*B05B 9/04* (2006.01)
*B05B 13/02* (2006.01)

(52) U.S. Cl.
CPC .............. *B05B 1/04* (2013.01); *B05B 9/0423* (2013.01); *B05B 13/0278* (2013.01)

(58) Field of Classification Search
CPC .......... B05B 1/04; B05B 15/06; B05B 15/60; B05B 13/0278; B05B 15/62; B05B 15/68; B05B 1/20; B05B 15/654; B05B 9/0423; B05B 15/652; B05B 12/00; A62C 31/05; B08B 9/34; F16L 27/0861; Y10T 403/32098
USPC ......................... 239/565, 550, 536, 568, 554
See application file for complete search history.

(56) References Cited

U.S. PATENT DOCUMENTS 641,295 A * 1/1900 Jackson .............. F16L 27/0861 239/587.2
2,683,626 A * 7/1954 Wahlin .................. B05B 15/652 239/536
5,295,626 A * 3/1994 Mirabito ............... B05B 9/0423 239/526
5,595,451 A * 1/1997 Harrison, Jr. ............. B05B 1/00 401/219
5,848,444 A * 12/1998 Christopherson ....... F16L 27/11 239/587.3
6,042,029 A * 3/2000 Massey .................. A62C 31/05 239/587.1
6,676,041 B1 1/2004 Mcloughlin et al.
2011/0284663 A1 11/2011 Natterer

* cited by examiner

*Primary Examiner* — Joseph A Greenlund
*Assistant Examiner* — Juan C Barrera
(74) *Attorney, Agent, or Firm* — Avyno Law P.C.

(57) ABSTRACT

A dual-headed paint spray wand with a central feed tube split into two arms, where the arms are separated at a distance from one another to permit a paint overlap when paint is sprayed from the two arms, and where the two arms are offset from one another vertically to allow one arm to spray ahead of the other.

14 Claims, 6 Drawing Sheets

DUAL-HEADED PAINT SPRAY WAND

RELATED APPLICATIONS

This application is a continuation of and claims priority of International Application No. PCT/US17/44593, filed on Jul. 31, 2017, titled DUAL-HEADED PAINT SPRAY WAND; which is a continuation of U.S. application Ser. No. 15/225,172 filed on Aug. 1, 2016, titled DUAL-HEADED PAINT SPRAY WAND (now U.S. Pat. No. 10,124,348 issued on Nov. 13, 2018), which claims priority to U.S. Provisional Patent Application Ser. No. 62/199,174 filed Jul. 30, 2015, titled DUAL-HEADED PAINT SPRAY WAND, all applications of which are incorporated in their entirety by reference in this application.

FIELD OF THE INVENTION

The invention relates to a dual-headed paint spray wand.

BACKGROUND OF THE INVENTION

Because the cost of both labor and material are two of the most important factors in the overall cost of a painting job, paint spray devices are often employed to control these costs. The prior art for paint spray systems is, however, highly inefficient, relying as it does upon a single paint spray tip, which is often mounted on a single paint spray arm. This results in poor transfer efficiency from overspray, often resulting in as much as 60% waste, and a slow application rate. A need thus exists for a paint spray system that offers greater efficiencies than existing systems in terms of both time and material savings.

SUMMARY OF THE INVENTION

The present invention is a dual-headed paint spray wand comprising a central paint feed tube that attaches at one end to a standard airless paint spray gun and attaches at the other end to a three-way manifold that splits the central feed tube into two arms, each with a 90° offset bend. At the end of each arm is a standard threaded coupling permitting the attachment to the end of each arm of a standard paint spray assembly comprising a tip guard, reversible paint spray tip and an on-off knob. The two arms are spaced apart so as to create an overlap of approximately 40% to 50% between the paint spray fans. The overlap is design to provide twice the coverage of traditional paint sprayers with each pass of the gun. In addition, the two arms are vertically offset. This is done to avoid having the spray fans collide and create turbulence.

In operation, a user of the invention attaches the wand to the paint feed tubing of any standard airless paint sprayer. The invention draws paint from the paint sprayer through the central feed tube, into the three-way manifold and into the two arms, where the paint flows into paint spray tips contained in two paint spray assemblies and out onto the surface to be painted in the shape of a fan. Because of the 40% to 50% overlap in the paint spray fans created by the spacing of the two arms, the invention permits the user to cover twice as much surface area as one using a sprayer equipped with only one tip, which effectively cuts labor time in half. Because of the vertical offset between tips, making one spray in advance of the other, the wand design avoids having the spray fans collide and create turbulence.

A method for painting a surface is also provided by the present invention. The method includes the step of providing a dual paint spray wand having two spray fans that overlap by 40-50% where one spray fan sprays in advance of the other. The method further comprises a means for stopping the flow of paint spray from at least one of spray fans using a shut-off valve.

Other features and advantages of the present invention will be apparent to those of ordinary skill in the art upon reference to following detailed description taken in conjunction with the accompanying drawings.

DESCRIPTION OF FIGURES

The invention may be better understood by referring to the following figures. The components in the figures are not necessarily to scale, emphasis instead being placed upon illustrating the principles of the invention.

DETAILED DESCRIPTION OF THE INVENTION

As illustrated in FIGS. 1-12, the present invention is a dual-headed paint spray wand 100. As will be explained further below, the dual-headed spray wand 100 of the present invention provides better coverage than traditional paint sprayers and cuts down on painting time.

Figure 1:
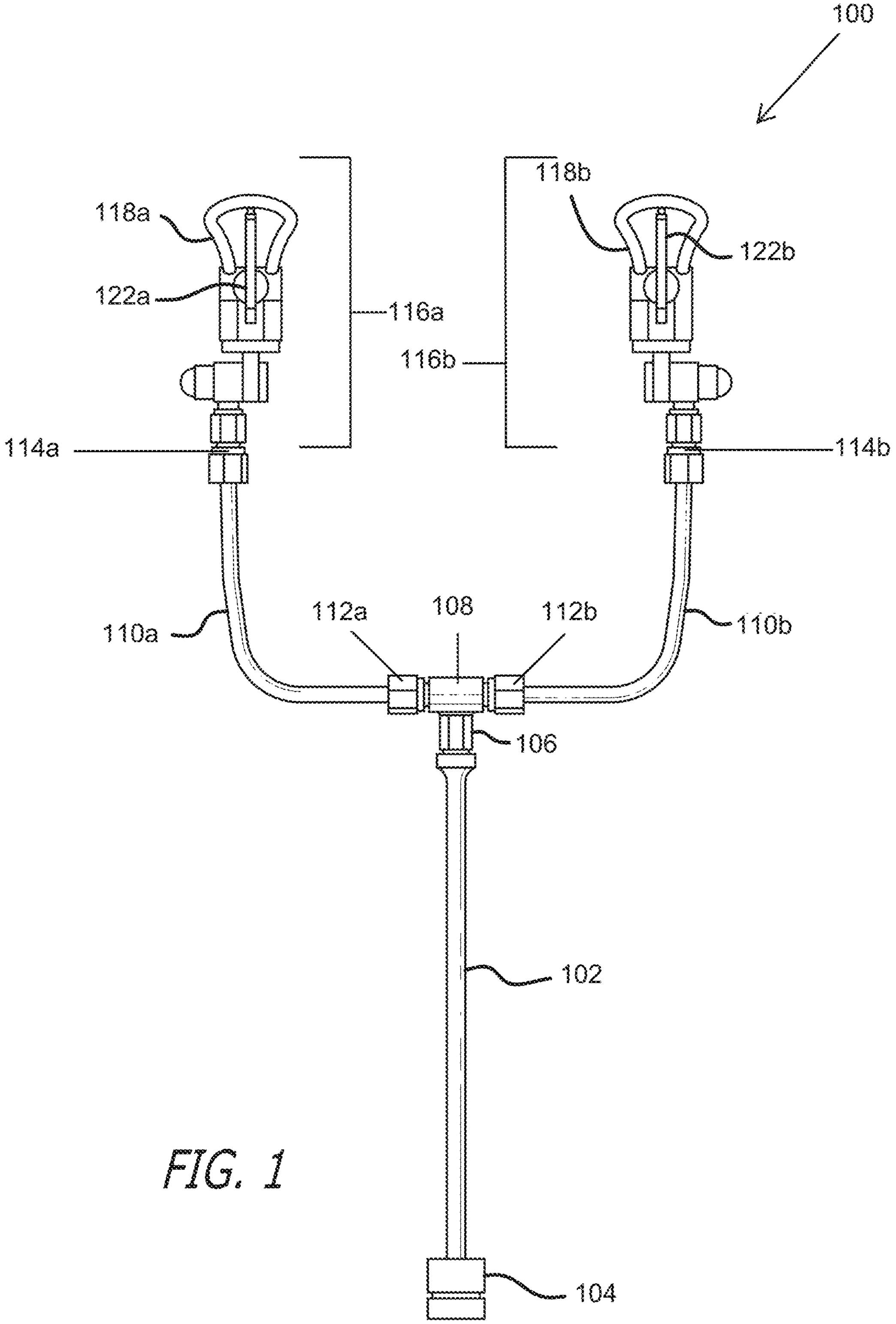
FIG. 1 is a front view of one example of an implementation of a paint spray wand of the present invention.

FIG. 1 is a front view of one example of an implementation of a paint spray wand 100 of the present invention. As illustrated by FIG. 1, the wand 100 consists of a central paint feed tube 102 between 2" and 10" in length that attaches at one end to a standard airless paint spray gun (not shown) using a hand-tightening or wrench tightened threaded connection 104. The feed tube 102 attached at the end opposing attachment to the paint spray gun to a three-way manifold 108 via threaded connection 106.

The three-way manifold 108 splits the central feed tube 102 into two arms 110*a* and 110*b*, positioned upward and separated from one other at a predetermined distance. As shown in FIG. 1, each arm may be connected to the manifold 108 by a threaded connection 112*a* and 112*b*, or alternatively maybe welded to the manifold. At the end of each arm 110*a* and 11*b* is a standard threaded coupling 114*a* and 114*b*, which permits the attachment of a standard paint spray assembly 116*a*, 116*b* (as shown in FIGS. 1-3) to the arms.

The standard paint spray assemblies 116*a,* 116*b* comprise tip guards 118*a,* 118*b* with reversible paint spray tips 120*a,* 120*b* (see FIG. 3), and knobs 122*a,* 122*b* that permit the user of the invention to shut-off the flow of paint to each assembly 116*a,* 116*b* by turning the knobs 122*a,* 122*b.*

The central feed tube 102 and two arms 110*a,* 110*b,* may be constructed of metal; however, those skilled in the art will recognize that they may be constructed of other durable materials, e.g. plastic, capable of supporting the paint spray assemblies 116*a,* 116*b* and allowing the flow of paint thereto pass without rupturing or bending.

Figure 2:
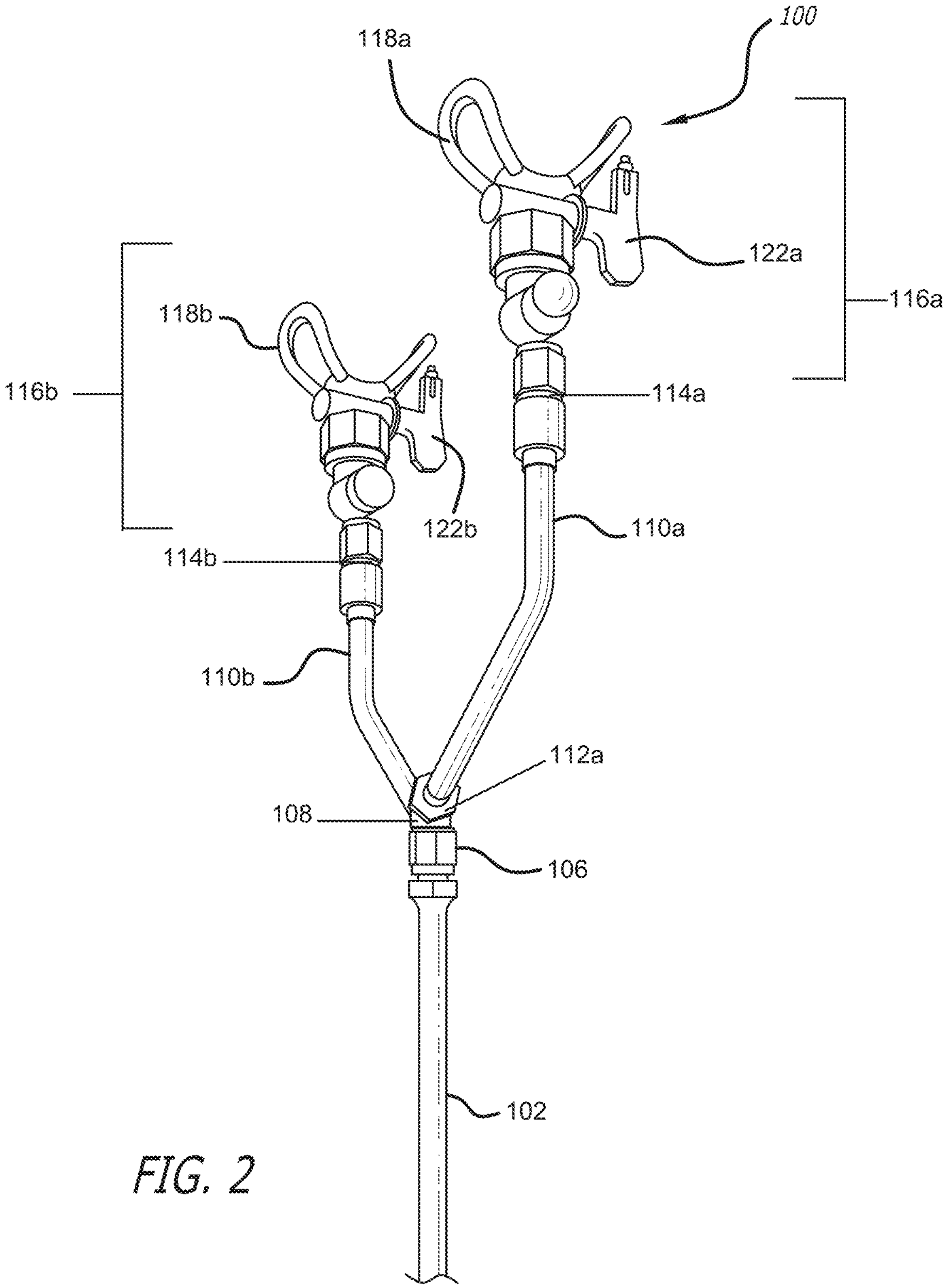
FIG. 2 is a side perspective view of the paint spray wand of FIG. 1.
Figure 3:
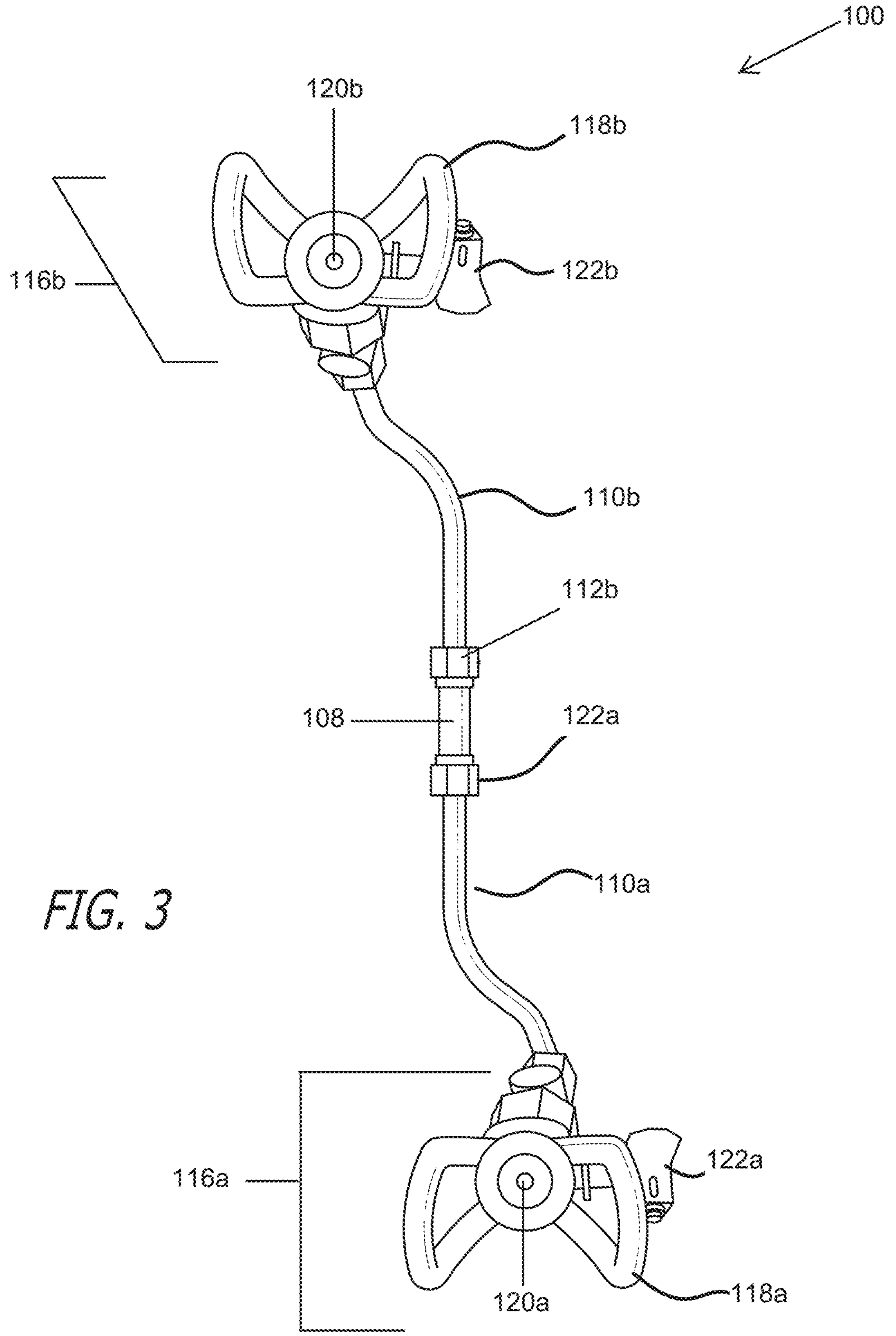
FIG. 3 is a top view of the paint spray wand of FIG. 1.

FIG. 2 is a side perspective view of the paint spray wand 100 of FIG. 1. FIG. 2 provides a closer view of the view of the threaded connection 106 to the three-way manifold 108 and the split of the central feed tube 102 into two arms 110*a* and 110*b* by the manifold 108. In this example, the two arms 110*a* and 110*b* are connected to the manifold 108 via threaded connections 112*a* and 112*b*. Also illustrated in FIG. 2 is the standard threaded coupling 114*a* and 114*b* connecting the standard paint spray assemblies 116*a,* 116*b* with tip guards 118*a,* 118*b*, reversible paint spray tips 120*a,* 120*b* and knobs 122*a,* 122*b* to the two arms 110*a* and 110*b.*

FIG. 3 is a top view of the paint spray wand 100 of FIG. 1. FIG. 3 best shows the vertical offset of the paint spray assemblies 116*a,* 116*b* which cause the paint spray from one tip 120*b* to spray in advance or behind the other tip 120*a* when in use. FIG. 3 also illustrates the three-way manifold 108 splitting the central feed tube 102 into the two side arms 110*a* and 110*b,* connected to the manifold 108 by threaded connections 112*a,* 112*b*. Also shown are the standard threaded couplings 114*a* and 114*b* connecting the standard paint spray assemblies 116*a*, 116*b* (having tip guards 118*a,* 118*b,* reversible paint spray tips 120*a,* 120*b* and knobs/shut-off valves 122*a,* 122*b*) to the two arms 110*a* and 110*b.*

Figures 4, 5, 6:
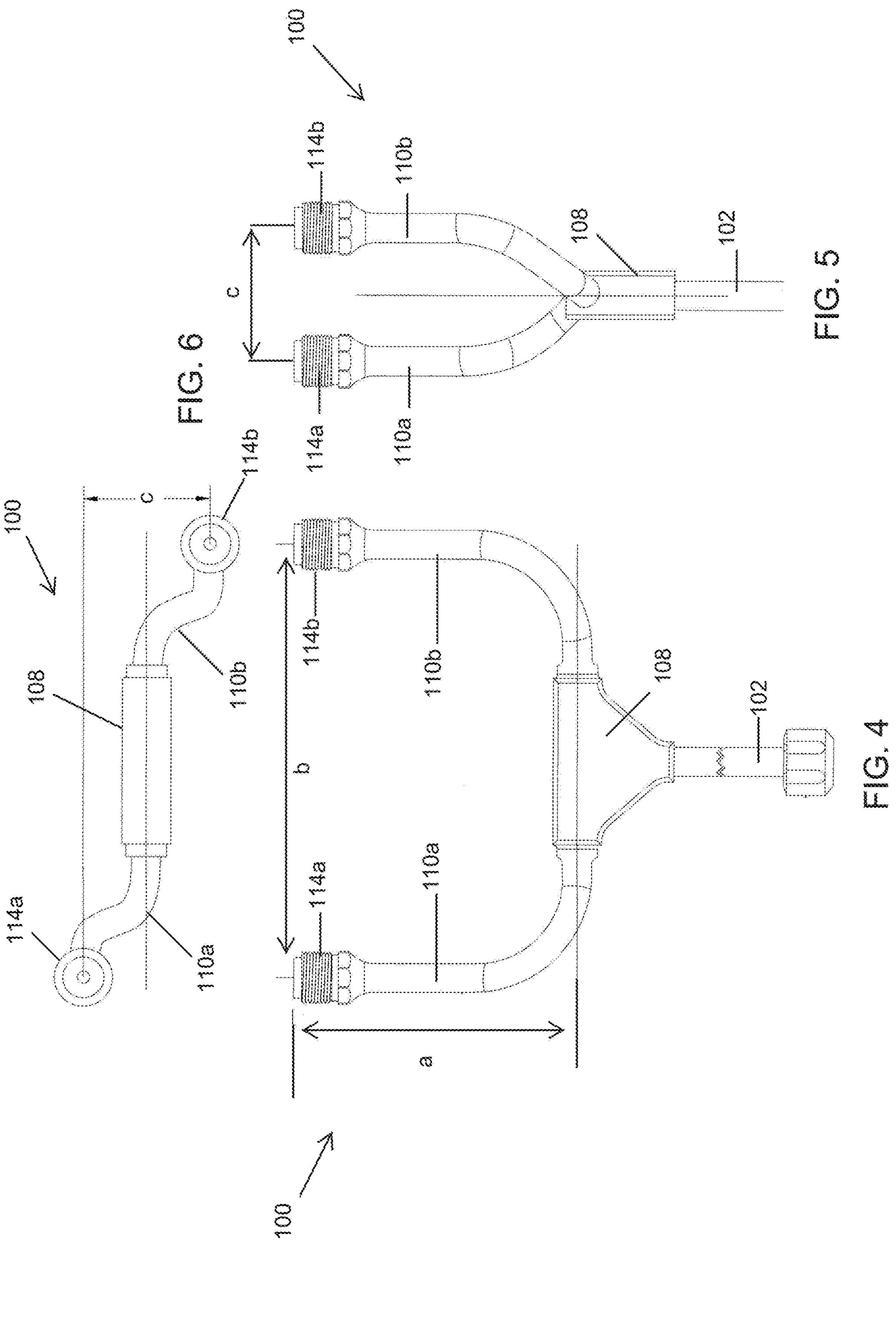
FIG. 4 is a front view of one example of an implementation of the paint spray wand of the present invention with the paint spray assemblies removed from the arms of the wand.
FIG. 5 is a side view of the paint spray wand of FIG. 4.
FIG. 6 is a top view of the paint spray wand of FIG. 4.

FIG. 4 is a front view of one example of an implementation of the paint spray wand 100 of the present invention with the paint spray assemblies 116*a* and 116*b* (FIGS. 1-3) removed from the arms 110*a* and 110*b* of the wand. In one example of an implementation, each arm may be of a length a, which may range between 5" and 10" for standard applications. The centers of the standard threaded couplings 114*a,* 114*b* or arms 110*a* and 110*b* are separated by distance b. During use, when paint is expelled from the tips 120*a* and 120*b* (FIG. 3), a paint fan is created. The distance b is designed to be a distance that permits overlap between the paint fans when the paint is sprayed from the tip. An approximate overlap of 40% to 50% between the paint spray fans is desirable, although the overlap could be greater or less depending upon the application or intended use. The overlap is design to provide more coverage with each pass of the wand 100 while spraying than traditional paint sprayers.

In general, distance b may vary based upon size of the paint tips 120*a,* 120*b* being used. For tips that produce larger fans, for example, a 14" fan, the spray wand 100 may be designed with distance b equal to approximately 7-8". For tips that produce a 12" fan, distance b may be approximately 6-7". For tips that produce a smaller fan, for example, a 6" fan, distance b could be approximately 3-4". Different spray wands 100 may be designed to accommodate specific tips and specific uses or applications. Depending upon the application and tip sizes, the distance b may vary from 3-8 inches. For some applications, the distance may be less than 3 inches or larger than 8 inches.

FIG. 5 is a side view of the paint spray wand of FIG. 4 and FIG. 6 is a top view of the paint spray wand of FIG. 4. FIGS. 5 and 6 best illustrates the vertical offset between the arms 110*a* and 100*b* to allow one paint spray assembly 116*a* and 116*b* (FIGS. 1-3) to spray in advance of the other. As illustrated, the two arms 110*a,* 110*b* are vertically offset by distance c. Distance c may range between ½" and 5". One purpose of the offset is to avoid having the spray fans collide and create turbulence.

While other paint spray assemblies 116*a* and 116*b* may be used without departing from the invention, generally, size 615 or 617 paint spraying tips 120*a* and 116*b* will be used with the paint spray assemblies 116*a* and 116*b.* The initial number "6" in the paint spraying tip number is doubled to determine the size of the paint fan produced by the tip. So, a 615 paint tip produces a fan of 12". The numbers 15 and 17 indicate the orifice size of the paint tip, which depends on the type of paint and thickness the user is spraying. Those skilled in the art will recognize that other sizes of paint tip may be employed with the invention, e.g. tips as small as a number 3, producing a 6" fan for finer enamel finishes, and as large as a number 7, producing a 14" fan, for large, commercial applications. Different sized paint spray wands 100 may be designed for such uses with smaller or larger tips without departing from the scope of the invention.

FIG. 7-10 illustrate front, rear, side and bottom views, respectively, of an example manifold 108 that may be used in connection with the paint spray wand 100 of the present invention. As described above, the manifold 108 separates the flow of paint from the paint feed tube 102 into two streams of paint that flow up through the two arms 110*a* and 110*b* to the paint spray assemblies 116*a,* 116*b*. This can be done using a T-type valve as shown in FIGS. 1-6 and as shown by the internal flow paths 800 of FIGS. 8-10. The valve or manifold 108, however designed, includes an input 702 into which the paint flows into the valve and two outputs 704.

Figure 7:
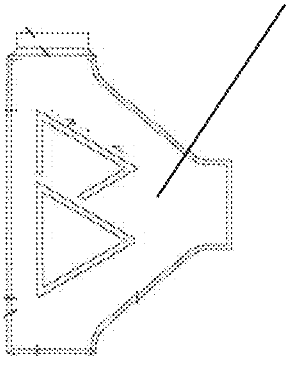
FIG. 7 is a front view of one example of the three-way manifold of the paint spray wand of the present invention.
Figure 8:
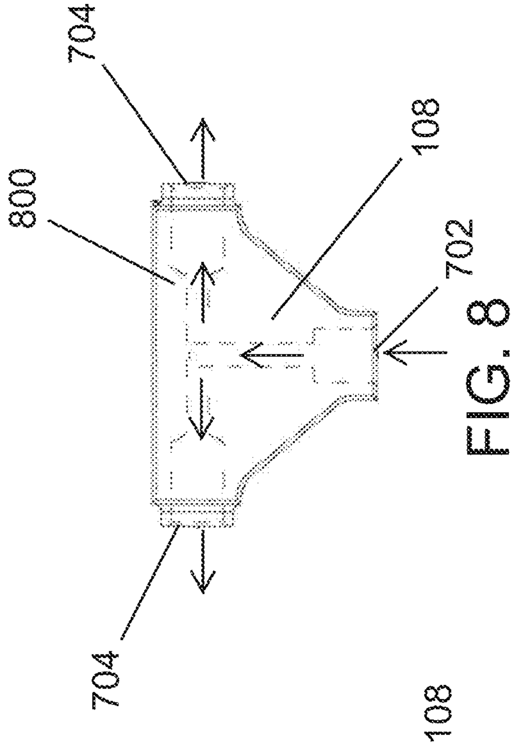
FIG. 8 is a rear view of the three-way manifold of FIG. 7.
Figure 9:
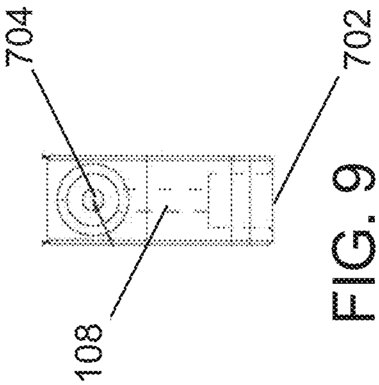
FIG. 9 is a side view of one example of the three-way manifold of FIG. 7.
Figure 10:
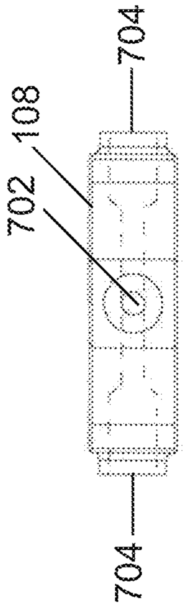
FIG. 10 is a bottom view of the three-way manifold of FIG. 7.

FIG. 7 shows one example of an external design for the manifold. Those skilled in the art will recognize that the external design is ornamental and can be designed with many different configurations without impacting functionality. FIG. 8 shows the flow of the paint through both the input 702 and two outputs 704. FIG. 9 shows one of the flow output orifices and FIG. 10 illustrated the input orifice 702.

Figure 11:
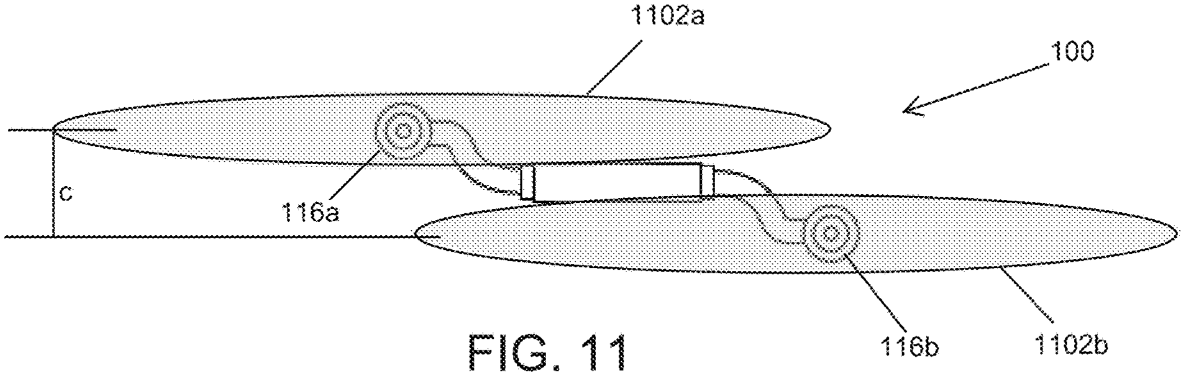
FIG. 11 is a top view of the paint spray wand of the present invention showing the spray fan produced by each paint spray assembly when in use.
Figure 12:
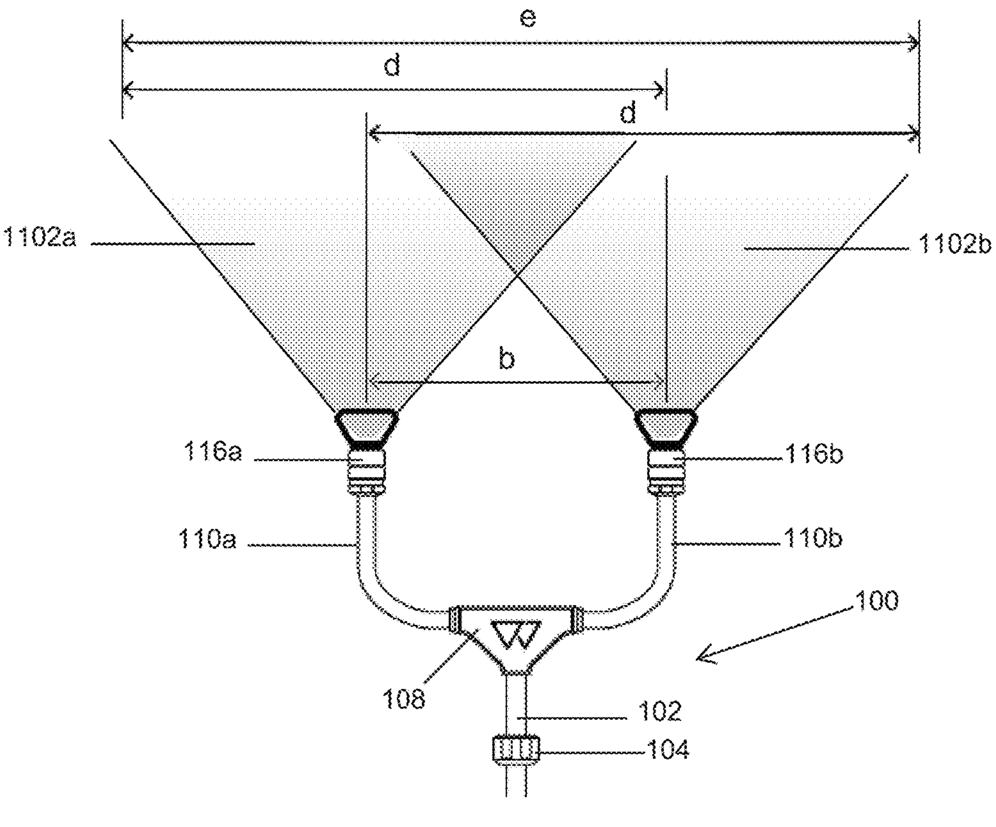
FIG. 12 is a front view of the paint spray wand of the present invention showing the spray fan produced by each paint spray assembly when in use.

FIGS. 11 and 12 illustrate the paint flow from the paint spray wand 100 when in use. FIG. 11 is a top view of the paint spray wand 100 showing the spray fan 1102*a* and 1102*b* produced by each paint spray assembly 116*a,* 116*b* when in use. FIG. 12 is a front view of the paint spray wand 100 showing the spray fan 1102*a,* 1102*b* produced by each paint spray assembly 116*a,* 116*b* when in use.

In operation, a user of the invention attaches the wand 100 of any standard airless paint sprayer, such as a Grayco 395 model, to the paint feed tube 102 using the hand-tightening or wrench tightened threaded connection 104. The wand 100 draws paint from the paint sprayer through the central feed tube 102, into the three-way manifold 108 and into the two arms 110*a*, 110*b,* where it flows into the paint spray tips 120*a* and 120*b* (FIG. 3) contained in the paint spray assemblies 116*a,* 116*b* and out onto the surface to be painted in the shape of a fan.

As illustrated in FIG. 12, because of overlap in the paint spray fans created by the spacing of the two arms 110*a,* 110*b,* the invention permits the user to cover twice as much surface area as one using a sprayer equipped with only one tip, which effectively cuts labor time in half. As illustrated in FIG. 11, because of the vertical offset between tips, one spray is in advance of the other. Thus, wand design 100 avoids having the spray fans 1102*a* and 1104*b* collide and create turbulence.

As discuss above, the space between the arms 110*a* and 110*b* to create the overlap may be between 3 to 8 inches or more. The paint fan created by the spray d can vary based upon the tip size of the paint spray assembly 116*a* and 116*b* and may generally vary from 6 to 14 inches, producing an overall spray e of generally 9 to 21 inches. Those skilled in the art will recognize that the wand 100 may be designed to vary the above distance ranges depending upon desired use, application and tip sizes used with various wand 100 sizes.

A method for painting a surface is also provided by the present invention. The method includes the step of providing a dual paint spray wand that sprays two overlapping paint fans where one paint fan sprays in advance of the other. The method may be performed in connection with the wand 100 taught above or any other wand 100 that provides for two spray arms that produce two paint sprays where the distance between the arms causes the paint spray to overlap and where the arms are vertically offset such that the spray from the arm positioned closest to the wall during operation will spray paint on the wall in advance of the spray coming from the other arm. The vertical offset places one arm in front of the other during use, such that one arm is closer in proximity to the wall than the other.

Further, knob 122*a* and 122*b* operate as shut-off valves and can, when turned, cause the paint flowing to the paint spraying tips 120*a*, 120*b* to be stopped. This can allow for the wand to be used as a single tip sprayer for tight cut-in on walls, around doors, casings and corners.

The foregoing description of implementations has been presented for purposes of illustration and description. It is not exhaustive and does not limit the claimed invention to the precise form disclosed. Modifications and variations are possible in light of the above description or may be acquired from practicing the invention. The claims and their equivalents define the scope of the invention.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

What is claimed is:

1. A dual-headed paint spray wand having a length and width and a central feed tube having a central longitudinal axis, where the central feed tube is split into two arms, where the entire length of each of the two arms are rigid and non-articulated and extend from a solid t-shaped manifold on a downstream end of the central longitudinal axis of the central feed tube, and where each arm has a spray end and where the spray end includes threading for coupling to a spray head capable of spraying paint and producing a paint fan when in use, where the spray ends of the two arms are separated at a predetermined distance from one another along the length of the dual-headed paint spray wand, with one arm positioned on each side of the central feed tube to permit the paint fan produced by the spray ends of the two arms when in use to overlap, and where the two arms are angled upward in directionally opposing fixed relationship to one another where one of the two arms is angled upward and forward and the other of the two arms is angled upward and rearward relative to one another such that the two spray heads are also vertically offset from one another to produce two paint spray fans that overlap one another, but that do not collide with one another by producing paint spray fans that spray in different parallel planes.

2. The wand of claim 1 where the paint overlap is a 40 to 50 percent overlap of the two paint fans produced by the two arms.

3. The wand of claim 1 where the predetermined distance between of the two arms is between 3 to 8 inches.

4. The wand of claim 1 where the spray end of each arm includes a paint spray assembly that produces a paint fan ranging from 6 to 14 inches before the spray pattern dissipates in the air.

5. A method for painting a surface, the method including the step of providing a dual paint spray wand that includes two arms extending from a central feed tube having a central longitudinal axis, where the entire length of each arm is rigid non-articulated and is fixedly attached to the central feed tube and extends from the central longitudinal axis of the central feed tube, where each the two arms having a corresponding spray head which are horizontally aligned when in the upright position and produce paint spray fans of predetermined sizes and that are separated from one another by a distance that is less than a total of the fan sizes produced by the horizontally aligned spray heads; and where the two arms are angled upward in directionally opposing fixed relationship to one another where one arm is angled upward and forward and the other arm is angled upward and rearward relative to one another such that the two horizontally aligned spray heads are also vertically offset from one another to produce two paint spray fans that overlap one another, but that do not collide with one another by producing paint spray fans that spray in different parallel planes.

6. The method of claim 5 where the paint spray fans overlap by 40-50 percent.

7. The method of claim 5 where the spray heads are paint spray assemblies separated from one another across the length of the dual paint spray wand by a predetermined distance.

8. The method of claim 5 where the spray heads are separated from one another across the length of the dual paint spray wand by 3 to 8 inches.

9. The method of claim 5 where one spray head sprays ahead of the other when painting a surface.

10. The method of claim 5 where each of the two arms has a spray end having threading for receiving the spray heads.

11. A dual-headed paint spray wand for connecting to a paint sprayer, where the spray wand has-a length and width and a central feed tube having a central longitudinal axis for receiving paint from a paint sprayer, where the central feed tube is split into two arms each having a spray end where the two arms are separated at a predetermined distance from one another, where the entire length of each arm is rigid, non-articulated, and is fixedly attached to the central longitudinal axis of the central feed tube with one arm positioned on each side of the central feed tube and where the two arms are angled upward and in opposing fixed relationship to one another, such that one arm is angled upward and forward and the other is angled upward and rearward relative to one another such that the two spray ends are also vertically offset from one another to produce two paint spray fans that overlap one another, but that do not collide with one another by producing paint spray fans that spray in different parallel planes.

12. The wand of claim 11 where the predetermined distance between of the two arms along the length of the dual-headed paint spray wand is between 3 to 8 inches and where the vertical offset of the two spray ends along the width of the dual-headed paint spray wand is between ½ an inch to 5 inches.

13. The wand of claim 11, where each of the spray end includes a spray head for spray paint.

14. The wand of claim 11, where each of the spray ends include threading for receiving spray heads for spraying paint.

* * * * *